United States Patent
Royle et al.

(10) Patent No.: US 10,338,263 B2
(45) Date of Patent: Jul. 2, 2019

(54) SIGNAL PROCESSING FOR A CABLE LOCATING INSTRUMENT

(71) Applicant: Metrotech Corporation, Santa Clara, CA (US)

(72) Inventors: John Mark Royle, Exeter (GB); Stephen John Petherick, Exeter (GB)

(73) Assignee: Metrotech Corporation, Santa Clara, CA (US)

( * ) Notice: Subject to any disclaimer, the term of this patent is extended or adjusted under 35 U.S.C. 154(b) by 226 days.

(21) Appl. No.: 14/792,510

(22) Filed: Jul. 6, 2015

(65) Prior Publication Data

US 2017/0010381 A1    Jan. 12, 2017

(51) Int. Cl.
    *G01V 3/17*    (2006.01)
(52) U.S. Cl.
    CPC ........................ *G01V 3/17* (2013.01)
(58) Field of Classification Search
    None
    See application file for complete search history.

(56) References Cited

U.S. PATENT DOCUMENTS

| | | | | |
|---|---|---|---|---|
| 5,325,318 A | * | 6/1994 | Harris | H03H 17/045 708/313 |
| 5,548,542 A | * | 8/1996 | Rauth | G06F 7/48 708/313 |
| 6,005,640 A | | 12/1999 | Strolle et al. | |
| 6,888,888 B1 | * | 5/2005 | Tu | H03D 3/007 375/240.01 |
| 2006/0158172 A1 | * | 7/2006 | King | G01V 3/081 324/66 |
| 2006/0218213 A1 | | 9/2006 | Shehata et al. | |
| 2007/0237411 A1 | | 10/2007 | Mizuno | |
| 2014/0280417 A1 | | 9/2014 | DeGarrido | |

FOREIGN PATENT DOCUMENTS

EP    1 907 886 B1    12/2014

OTHER PUBLICATIONS

International Search Report for PCT Application No. PCT/US2016/038908 issued by the US Searching Authority dated Sep. 14, 2016; pp. 1-2.
Written Opinion of the International Searching Authority for PCT Application No. PCT/US2016/038908 issued by the US Searching Authority dated Sep. 14, 2016; pp. 1-4.

\* cited by examiner

*Primary Examiner* — Herve-Louis Y Assouman
(74) *Attorney, Agent, or Firm* — Haynes and Boone, LLP

(57) ABSTRACT

In accordance with some embodiments, a method and apparatus for providing both a low-pass filter value and a high-pass filter value is presented. The combined filter receives an input value into a half-band finite impulse response (FIR) filter with an odd number of taps labeled 0 through N with corresponding filter coefficients labeled 0 through N where odd numbered filter coefficients are zero, the FIR filter providing a filter value. The median value from the FIR filter is digitally shifted to provide a half median value. The half median value is added to the filter value to provide the low-pass filter value and is subtracted from the filter value to provide the high-pass filter value.

7 Claims, 7 Drawing Sheets

SIGNAL PROCESSING FOR A CABLE LOCATING INSTRUMENT

BACKGROUND

1. Technical Field

The present disclosure relates to detection of underground lines and, in particular, to signal processing for cable location equipment.

2. Discussion of Related Art

Underground pipe and cable locators (often termed line locators) have existed for many years and are described in many issued patents and other publications. Line locator systems typically include a mobile receiver and a transmitter. The transmitter is coupled to a target conductor, either by direct electrical connection or through induction, to provide a current signal on the target conductor. The receiver detects and processes signals resulting from the electromagnetic field generated at the target conductor as a result of the current signal, which can be a continuous wave sinusoidal signal provided to the target conductor by the transmitter.

The transmitter is often physically separate from the receiver, with a typical separation distance of several meters or in some cases up to many kilometers. The transmitter couples the current signal, whose frequency can be user chosen from a selectable set of frequencies, to the target conductor. The frequency of the current signal applied to the target conductor can be referred to as the active locate frequency.

In some cases, for example in power lines, the target conductor may carry a current signal without the need for an outside transmitter. In either case, the target conductor then generates an electromagnetic field at the active locate frequency in response to the current signal.

Therefore, there is a need to better process the electromagnetic signals received at the receiver.

SUMMARY

In accordance with some embodiments, a combined filter is provided that includes a half-band finite-input response (FIR) filter having an odd number of taps, numbered 0 through N, where N is an even number, and a median tap, the median tap being one of the odd number of taps, wherein filter coefficients for each odd numbered tap is zero, the half-band FIR response filter providing a filter value from an input value to the half-band FIR; a right shifter that receives the a median value from the median tap and shifts the median value right by one bit to provide a half median value; an adder that adds the filter value and the half median value to provide a low-pass filter value; and a subtractor that subtracts the half median value from the filter value to provide a high-pass filter value.

In some embodiments, a method of providing both a low-pass filter value and a high-pass filter value includes receiving an input value into a half-band finite impulse response (FIR) filter with an odd number of taps labeled 0 through N with corresponding filter coefficients labeled 0 through N where odd numbered filter coefficients are zero, the FIR filter providing a filter value; digitally shifting a median value from the FIR filter to provide a half median value; adding the half median value to the filter value to provide the low-pass filter value; and subtracting the half median value from the filter value to provide the high-pass filter value.

These and other embodiments will be described in further detail below with respect to the following figures.

The drawings may be better understood by reading the following detailed description.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Additionally, the drawings are not to scale. Relative sizes of components are for illustrative purposes only and do not reflect the actual sizes that may occur in any actual embodiment of the invention. Like numbers in two or more figures represent the same or similar elements. Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Further, embodiments of the invention are illustrated with reference to electrical schematics. One skilled in the art will recognize that these electrical schematics represent implementation by physical electrical circuits, implementation by processors executing algorithms stored in memory, or implementation by a combination of electrical circuits and processors executing algorithms.

Figure 1:
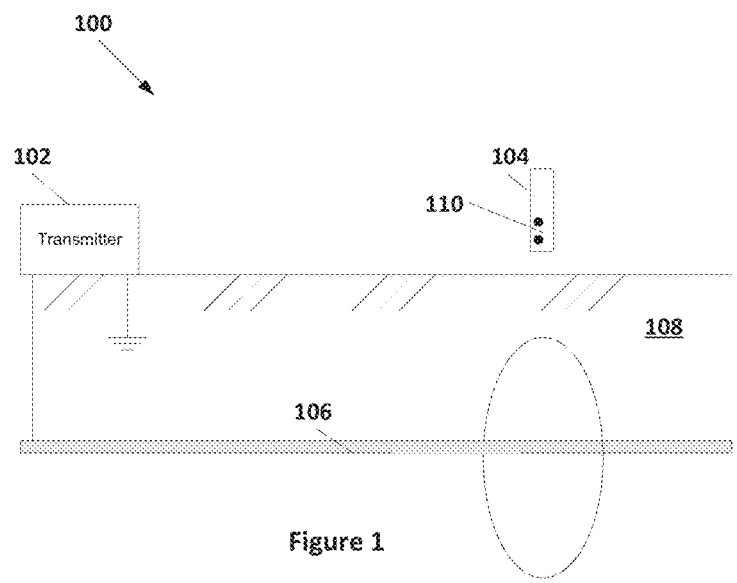
FIG. 1 illustrates operation of a line locator system according to some embodiments of the present invention.

FIG. 1 illustrates a line location system 100 according to some embodiments of the present invention. As shown in FIG. 1, line location system 100 includes a receiver 104. In some systems, a transmitter 102 can be electrically coupled to a conductor 106 that is buried in the ground 108. Conductor 106 may, for example, be a conducting pipe or a wire and is generally considered to be a long conducting structure. Transmitter 102 provides an electrical signal along conductor 106, which then transmits an electromagnetic signal along its length. In some cases, conductor 106 is a power cable, in which case a transmitter 102 is not used for conductor 106 to radiate. The electromagnetic signal from conductor 106 is received by one or more antennae 110 on receiver 104. Receiver 104 is passed over the surface of the ground 108 in order to locate the position of conductor 106 beneath the ground. From the received signals at the antennae 110, the depth and position of conductor 106 can be determined.

Power lines, including single phase or three phase lines, emit a large collection of harmonics, which are typically odd number harmonics on the line frequency (50 or 60 Hz). There may be small coupling into the even harmonics, but radiation at these harmonics is at a much lower level (−40 dB, for example) than their odd-harmonic counterparts. Additionally, ultra-low frequency (16 kHz to 30 kHz) is often used for long range radio, particularly by the military. This RF energy tends to couple to buried utilities and causes the utilities to re-radiate. A strong locate signal can be achieved by removing the common mode signal (air born component) and locating on the re-radiated component from the utility.

As discussed above, where conductor 106 is a power cable, receiver 104 processes two modes of operation: power mode and radio mode. Buried power cables radiate magnetic fields at frequencies that are strongly correlated to the odd harmonics of the power line frequencies (60 Hz, 180 Hz, 300 Hz . . . for a 60 Hz power system). Receiver 104 often has the capability of detecting harmonic components of a power cable out to about five (5) kHz. Detection of the odd harmonics from buried power cables is referred to as the power mode.

Further, Very Low Frequency (VLF) radio transmission in the frequency band of about 12 kHz to 28 kHz can also be re-radiated by buried pipes and cables. Typically, receiver 104 is responsive to these components in the frequency band, which form a negative field gradient in the received signal. In other words, a differential signal response from antennas 110 will exhibit a strong common mode rejection in these frequency bands.

Existing methods of processing these signals combine power and radio modes into a single response, which is sometimes referred to as combined passive mode. Embodiments of the present invention, as is further described below, provides a different alternative to simultaneously processing both the power and radio modes, which helps in better locating capabilities.

Figure 2:
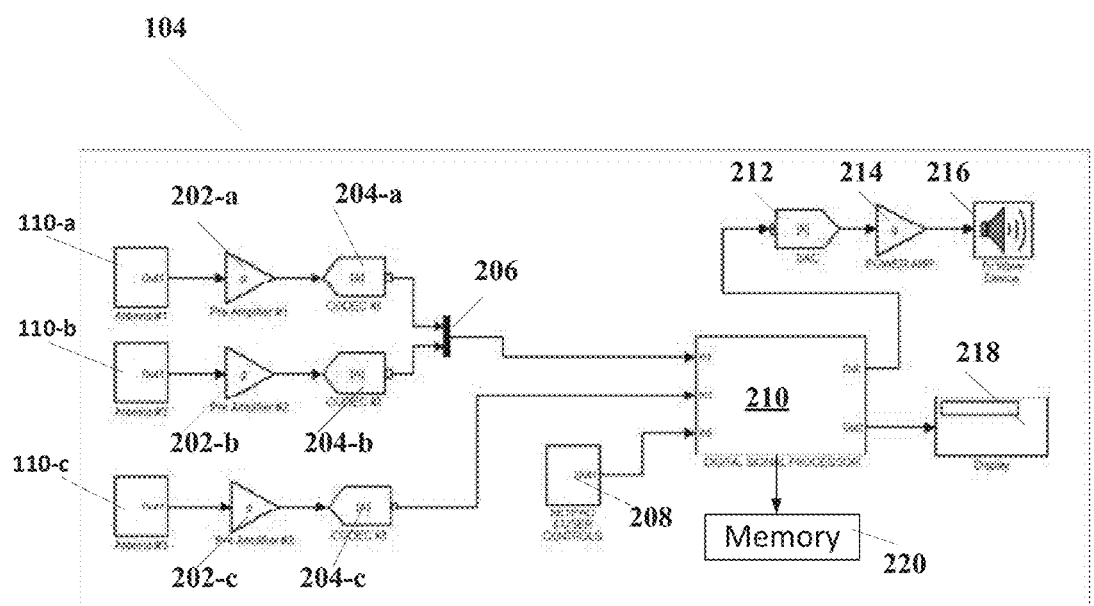
FIG. 2 illustrates at a high level block diagram of a receiver in a line locator system according to some embodiments of the present invention.

FIG. 2 illustrates a block diagram of an example receiver 104. Receiver 104 includes one or more antennas 110. In FIG. 2, three antennas 110-a, 110-b and 110-c (collectively antennas 110) are illustrated, although in general any number of antennas 110 may be present. Each of antennas 110 can be, for example, conventional low frequency ferrite antennas that provide high sensitivity and low noise. As is shown in FIG. 2, the signals from antennas 110-a, 110-b, and 110-c are input to amplifiers 202-a, 202-b and 202-c (collectively amplifiers 202), respectively. Amplifiers 202, also referred to as pre-amplifiers 202, can ensure that the sensor noise dominates any analog-to-digital conversion (ADC) quantization noise (for example by about +6 dB) and further can have transfer functions that normalize the antenna response from each of antennas 110 as a function of frequency. The combination of antenna 110 and amplifier 202, in some embodiments, can operate from in the range of about 10 Hz to 200 kHz, and therefore will detect both the power band signals and the radio band signals from cable 106.

The output signals from amplifiers 202a, 202b and 202c are input to coder-decoders (CODECs) 204-a, 204-b and 204-c (collectively CODECs 204), respectively. CODECs 204 can provide anti-aliasing filters and analog-to-digital conversion (ADC) of the input signals. For example, CODECs 204 may be 24-bit Delta-Sigma convertors that operate at sampling rates $F_s$ in the range of about 4 kHz to about 96 kHz. Delta-Sigma ADCs 204 provide a sharp anti-alias filter that tracks the sampling frequency at $F_s/2$. The ADC 204 can have a high dynamic range and performance, for example with typical signal-to-noise-plus-distortion (S/(N+D)) of about +93 dB at 50 kHz bandwidth.

As shown in FIG. 2, the signals from CODECs 204 may be multiplexed and then input to a digital signal processer (DSP) 210, as shown with the outputs from CODECs 204-a and 204-b input to multiplexer 206, or input directly to DSP 210, as shown with the output signal from CODEC 204-c. DSP 210 can be any available processor capable of processing the data signals received from antennas 110. In some embodiments DSP 210 can be, for example, a 16-bit or 32-bit Fixed Point Processor that runs, for example, at a clock speed of about 500 MHz. DSP 210 can have advanced mathematic processing engines which are designed to multiply and accumulate large data arrays at high speed.

As is further shown in FIG. 2, DSP 210 can be coupled with a user interface 208, which may include keypads, pointing devices, or other user controls. DSP 210 can be further coupled to a display 218 that provides information to the user. In some embodiments, user interface 208 and display 218 may be combined into a touchscreen device. DSP 210 may further be coupled to a speaker 21. Data from DSP 210 can be provided to a digital-to-analog converter (DAC) 212, which provides an analog signal to an amplifier 214 that drives speaker 216. In some embodiments, DAC 212 may be part of a delta-sigma CODEC with ADCs 204. Amplifier 214 may, for example, be a linear amplifier, for example with a bridge tied load, which drives speaker 216.

DSP 210 may further be coupled to memory 220, which may store data and programming instructions for DSP 210. Memory 220 may include volatile and non-volatile memory in any combination.

Conventionally, as is described in European Patent EP 1 907 886, the power mode and radio mode are filtered separately and a combined response is produced. However, embodiments of the present invention provide a single filter that produces both outputs in a single operation. Embodiments of the present invention, therefore, can be a more efficient process for use in cable locating instruments.

As illustrated in FIG. 2, such filtering and processing can be accomplished entirely in DSP 210. However, the filtering and processing described herein can also be accomplished in hardware outside of DSP 210. Consequently, embodiments of the present invention are described in terms of structural diagrams, which may represent a hardware implementation or may represent instructions executed with DSP 210.

Figure 3:
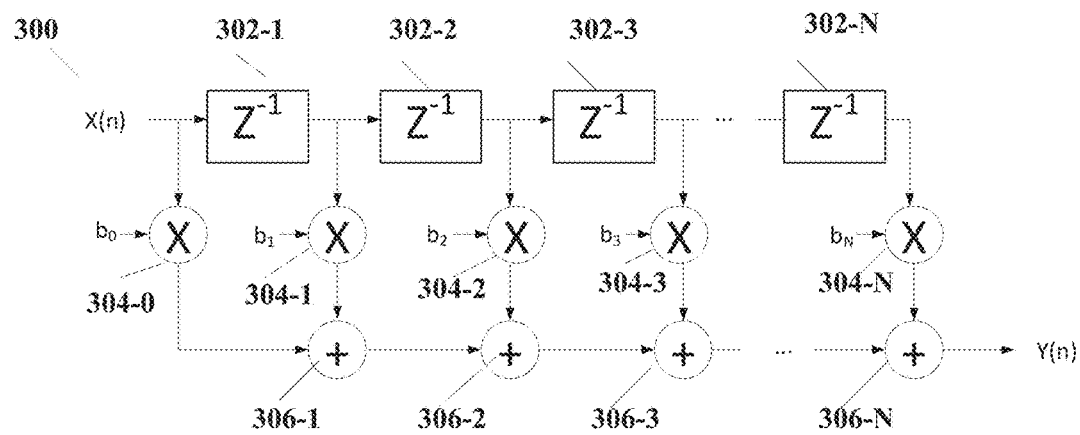
FIG. 3 illustrates a typical finite impulse response (FIR) filter.

FIG. 3 illustrates an example generally of a finite impulse response (FIR) filter 300. As shown in FIG. 3, filter 300 includes series coupled delays 302 (delays 302-1 through 302-N), multipliers 304 (multipliers 304-0 through 304-N) and adders 306 (306-1 through 306-N). Delays 302, the outputs of which may be referred to as taps, provide for an array of delayed input values X(n) through X(n−N). The input signal and the output signals from each of delays 302 are input to one of multipliers 304 to be multiplied by a corresponding filter coefficient $b_0$ through $b_N$. Summers 306 then provide a sum of the input X(n) multiplied by $b_0$ and each of the outputs of the multipliers 304-1 through 304-N, resulting in the filter value $$Y(n)=\Sigma_{i=0}^{N}b_iX(n-i).$$

The filter coefficients $b_0$ through $b_N$ define the characteristics of the filter.

Figure 4:
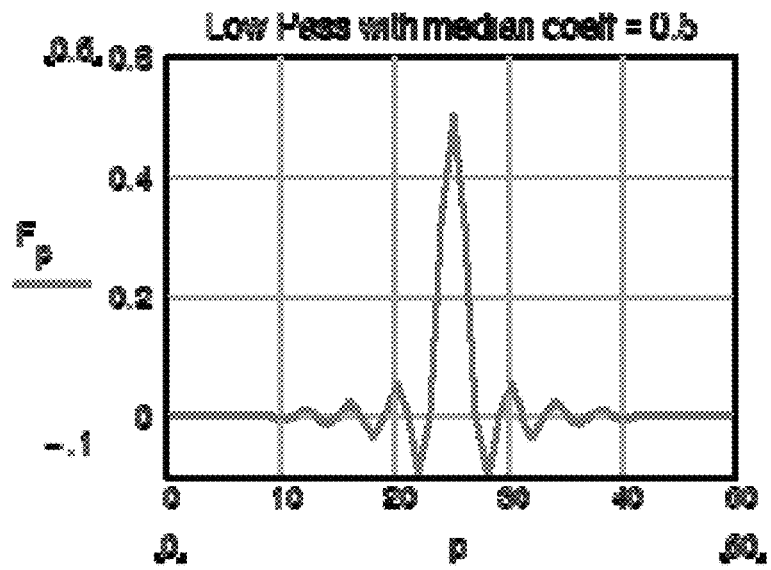
FIG. 4 illustrates the impulse response of a half-band low pass FIR filter.

Embodiments of the present invention can be implemented on a half-band FIR filter with a pass band and stop band symmetrical with a quarter of the sampling frequency, $F_s/4$. Given a half-band Finite Impulse Response Filter (FIR) with a pass band and stop band symmetrical to $F_s/4$ has alternate zero coefficients, apart from the median coefficient which is exactly ½. In other words, all of the odd-numbered filter coefficients $b_1$ through $b_{N-1}$ are 0 except for the center odd numbered coefficient, which is ½. This statement is only applicable to an odd number of filter taps (i.e. N+1 is an odd number). The filter coefficients can then be designated as $\{b_0, 0, b_2, 0, \ldots b_{2i}, b_{2i+1}=½, b_{2i+2}, 0 \ldots b_N\}$, where 2i+1 is the center (or median) value. This characteristic is illustrated in the impulse response of a half-band low pass FIR as is illustrated in FIG. 4.

Figure 5A:
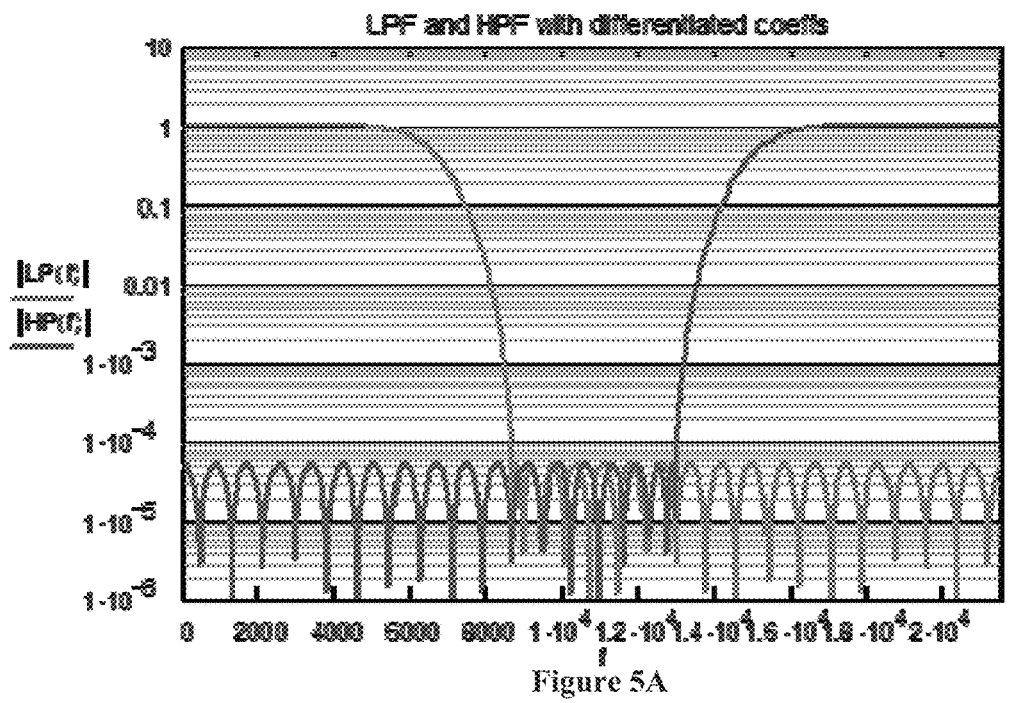
FIG. 5A illustrates the frequency response of a low-pass filter and a mirrored high-pass filter.
Figure 5B:
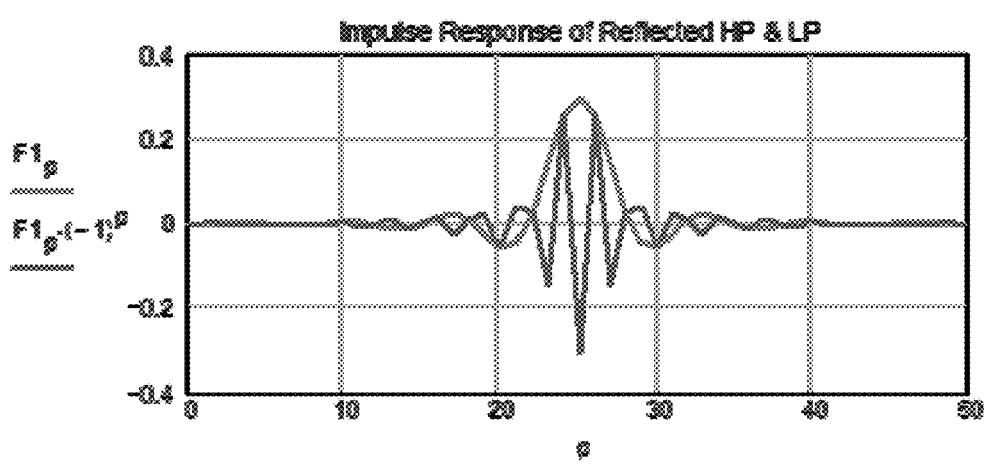
FIG. 5B illustrates the impulse response of the low-pass filter and the mirrored high-pass filter illustrated in FIG. 5A.

Furthermore, as is illustrated in FIGS. 5A and 5B, if the filter coefficient array of a low pass FIR is multiplied by the array $\{+1, -1, +1, -1 \ldots\}$, the resulting filter coefficients will define a high pass filter that in has a frequency response that is the reflection of the low pass filter frequency response about the frequency $F_s/4$. This operation is the equivalent of convolving an impulse response function with a differentiator, as is illustrated in FIG. 5B.

However, observing from above that all of the filter coefficients that are to multiplied by −1 to generate the symmetrical high pass filter from the half-band low pass filter are 0 (the odd numbered coefficients) except for the center or median filter value. Consequently, using a half-band FIR low pass filter as described above, the symmetrical high-pass filter will have all the same coefficients as the low pass filter except that the center filter coefficient $b_{2i+1}$ becomes −½ instead of +½. In other words, all of the coefficients that would have been multiplied by −1 are 0 except for the center coefficient which becomes −½. Appendix A, which is incorporated in this disclosure in its entirety, provides further mathematical proof of the underlying assumptions discussed above.

With consideration of the above discussion, a high fidelity filter can be computed with less than half the number of multiply accumulates for the equivalent FIR aperature. This results from the fact that there is no need to multiply and accumulate where the coefficient is 0. Furthermore, by right shifting the median value by 1 and adding, the low pass filter output is provided and by right shifting the median value by 1 and subtracting, the high pass filter output is provided. Right shifting the median value by 1 is a divide-by-2 operation, which provides the center coefficient value for both the high pass filter and the low pass filter.

Figure 6:
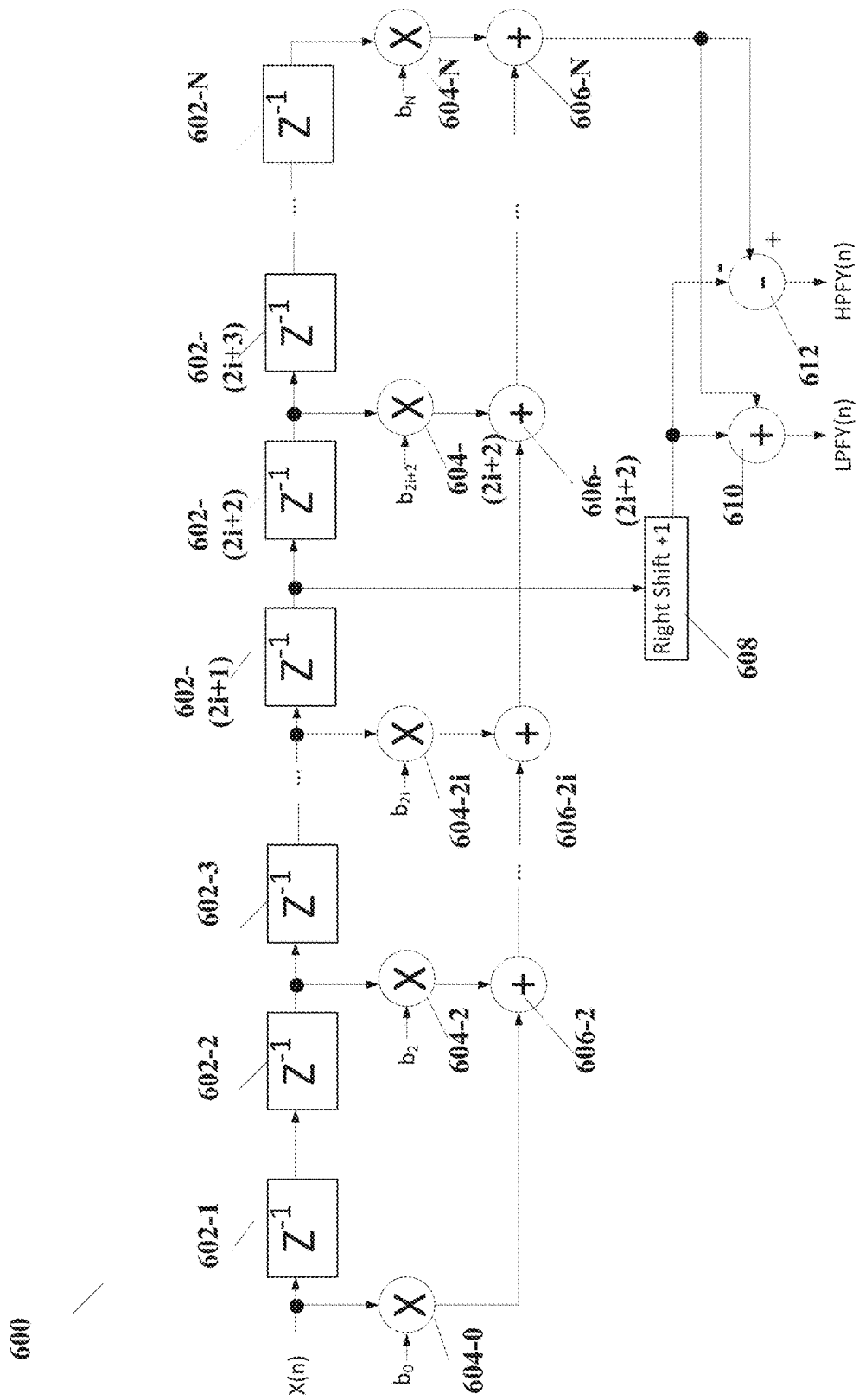
FIG. 6 illustrates a combined filter according to some embodiments of the present invention.

FIG. 6 illustrates a combined filter 600 according to some embodiments of the present invention. As illustrated in FIG. 6, combined filter 600 includes a series connected array of delays 602-1 through 602-N. The median value (the center value) is provided by delay 602-(2i+1). In some embodiments N is given by 2(2i+1), where i=0, 1, 2, . . . . As is further illustrated, the output value from each of the even numbered delays (the input value X(n) plus delays 602-2, 602-4 . . . 602-N) are then input to multipliers 604-0, 604-2, . . . 604-N where those values are multiplied by the non-zero coefficients $b_0$, $b_2$, . . . $b_N$. The output values from the odd numbered delays (602-1, 602-3 . . . 602-(N−1) are not input to multipliers as the corresponding coefficients are 0. The values from multipliers 604-0 through 604-N are then summed by adders 606-2 through 606-N to provide the output value from adder 606-N. The output value from adder 606-N, the filter value, is then input to adder 610 and subtractor 612. The median value from delay 602-(2i+1) is input to right shift register 608, where the median value is digitally shifted right by one bit in order to provide half the median value. The value generated by right shift register 608 is then added to the output value from summer 606-N in adder 610 to provide the low pass filter value LPFY(n) and subtracted from the output value from summer 606-N in subtractor 612 to provide the high pass filter value HPFY(n).

As such, the output signals from combined filter 600 as shown in FIG. 6 is given by $$LPFY(n) = \sum_{j=0}^{2i+1} b_{2j}X(n-2j) + \frac{1}{2}X(n-(2i+1))$$

$$HPFY(n)=\Sigma_{j=0}^{2i+1}b_{2j}X(n-2j)-½X(n-(2i+1)),$$

where 2(2i+1) is N, the total number of delays.

Consequently, for less than half the number of multiply-accumulate operations (with respect to the equivalent FIR aperture), followed by 1 right shift, followed subsequently by 1 addition and separately 1 subtraction, the result is twice filtered to two separate outputs separated in frequency. These two separate output values LPFY(n) and HPFY(n) are provided by a single convolution.

Example instructions for performing the operation illustrated in FIG. 6 on DSP 210 as illustrated in FIG. 2 is provided in C++ as follows:

```
voidVmPowerRadioFilter::HalfBandLpfHpf
(int invar, FIR_HISTORY_S* pFir, constint* pCoeffs, int length,
intrShift, int&rLPF, int&rHPF)
{
longlongsumnum=0;
inti;
intcoeff_index=0;
int median = (length−1)>>1;
pFir->history[pFir->index]=invar;
pFir->index+=1;
pFir->index &= FIR_BUFFER_SIZE;
intconvolve_index = pFir->index;
intmiddle_index = (convolve_index+median) & FIR_BUFFER_SIZE;
int middle = (pFir->history[middle_index])>>1;
for (i=0; i<= median; i++) {
    intx_data = pFir->history[convolve_index];
    sumnum += multiply_32(pCoeffs[coeff_index],x_data);
    coeff_index+=2;
    convolve_index+=2;
    convolve_index&= FIR_BUFFER_SIZE;
}
rLPF = sumnum−middle;
rHPF = sumnum+middle;
};
```

Figure 7:
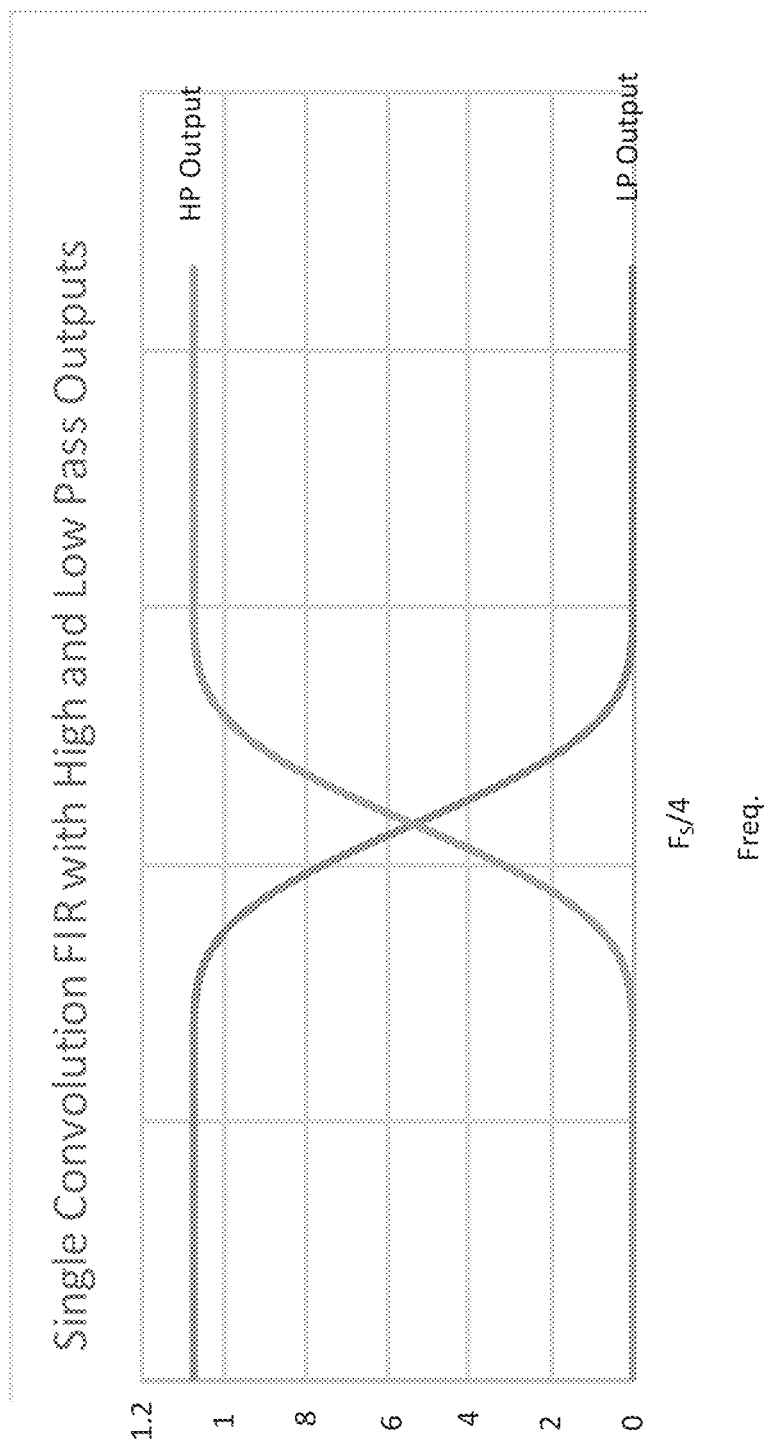
FIG. 7 illustrates the frequency response of the two output signals from the combined filter illustrated in FIG. 6.

FIG. 7 illustrates an example swept frequency response using a single-convolution FIR with high and low pass outputs resulting from the embodiments illustrated in FIG. 6. The gains and stop band attenuations are a function of the number of coefficients and the overall order of the single filter. In some embodiments, embodiments of the present invention can be applied in a cascade, for example up to $4^{th}$ or $5^{th}$ order. Furthermore, some embodiments of the invention can be computed at half the sample rate because of the use of the half-band filters.

By suitable choice of sampling frequency $F_s$ it is possible to construct the dual output half band FIR according to some embodiments such that it can be used for audio and visual outputs of a cable locator 104 as is illustrated in FIG. 2. As discussed above, power mode signals can be detected by the low pass filter output LPFY(n) while radio mode signals can be provided by the high pass filter output HPFY(n). Typically, a bar graph can be produced from the weighted sum of the individual outputs LPFY(n) and HPFY(n) and displayed on display 218. Alternatively, separate bar-graphs can be produced for the power and radio signal magnitudes processed in isolation (i.e., separate bar graphs for LPFY(n) and HPFY(n), which may be processed further by DSP 210 prior to display). The audio components can be processed separately using mixers and band-pass filters to produce so called "real sound", which is an audible response which contains the real spectral components of the applicable signal.

In the preceding specification, various embodiments have been described with reference to the accompanying drawings. It will, however, be evident that various modifications and changes may be made thereto, and additional embodiments may be implemented, without departing from the broader scope of the invention as set for in the claims that follow. The specification and drawings are accordingly to be regarded in an illustrative rather than restrictive sense.

---

Appendix A: VSCAN Power/Radio Half-Band Filter Idea

N := 5000

$i := 0 \ldots \dfrac{N}{2} - 1$  $\quad$ $grid_i := \dfrac{i}{N}$  $\quad$ Need at least 10 * Filter Size points on the grid.

$$\text{filter}(x, pb, sb) := \begin{vmatrix} 1 & \text{if } x < pb \\ 1 - \dfrac{x - pb}{sb - pb} & \text{if } (pb \leq x < sb) \\ 0 & \text{otherwise} \end{vmatrix}$$

Ideal LP Filter Response (Linear Interpolation in Transition Band)

pbw := 1  $\quad$ sbw := 1  $\quad$ tbw := $10^{-5}$  $\quad$ Optimisation Weights for Pass, Transition & Stop Bands fs := 43200  $\quad\quad\quad\quad\quad\quad\quad\quad\quad\quad\quad\quad\quad\quad\quad\quad\quad$ Sampling Frequency $Z(f) := e^{\left(2 \cdot \pi \cdot i \cdot \frac{f}{fs}\right)}$  $\quad\quad\quad\quad\quad\quad\quad\quad\quad\quad\quad\quad$ Z-plane to Frequency Domain Transformation $f := 0, \dfrac{fs}{1000} \ldots \dfrac{fs}{1}$  $\quad\quad\quad\quad\quad\quad\quad\quad\quad\quad$ Frequency Sweep for Filter Reponse [0 ... fs/2]

pb := 0.15  $\quad\quad\quad\quad\quad\quad$ sb := 0.5-pb
$response_i$ := filter($grid_i$, pb, sb)
$weights_i$ := if($grid_i \leq$ pb, pbw, if($grid_i \geq$ sb, sbw, tbw))  $\quad$ Define the normalised band edges for the transition band F1 := remez(grid, response, weights, 23)  $\quad$ Response & Weights matrice required for Remez LEN := length(F1)
p := 0 ... LEN-1

Figure 8:
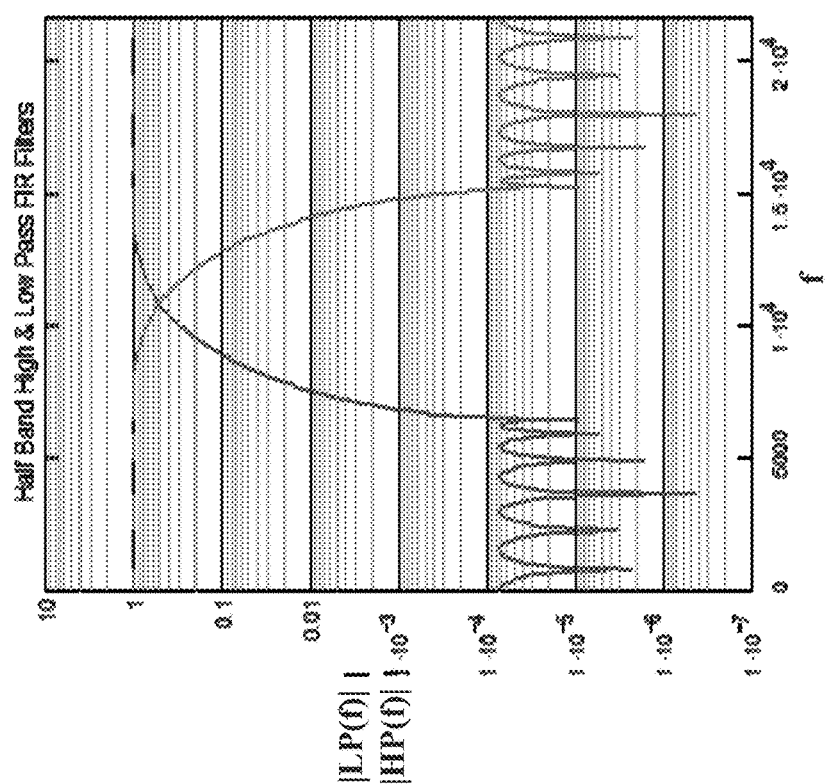
FIG. 8 illustrates the symmetrical frequency response of the two output signals.
Figure 9B:
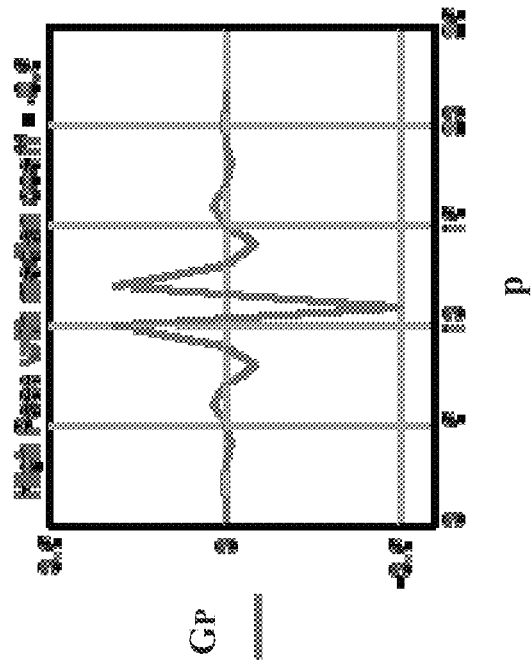
FIG. 9B illustrates the impulse response of a high pass FIR filter.
Figure 9A:
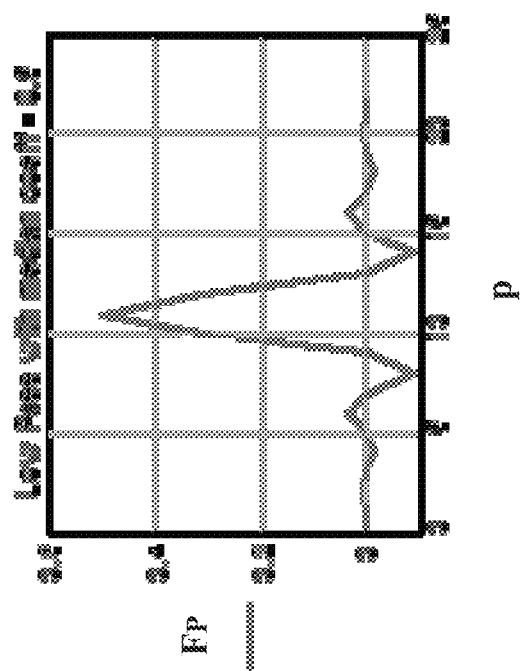
FIG. 9A illustrates the impulse response of a half-band low pass FIR filter.

$F2_p := F1_p \cdot \left[\dfrac{(-1)^p + 1}{2}\right]$  $\quad\quad$ $F2_{\frac{LEN-1}{2}} := 0.5$  $\quad\quad$ $\sum_p F2_p = 0.5$ F := F2  $\quad\quad\quad\quad\quad\quad\quad\quad$ $LP(f) := \sum_p F_p \cdot Z(f)^{(-p)}$  $\quad\quad$ G := F $G_{\frac{LEN-1}{2}} := -0.5$  $\quad\quad\quad$ $HP(f) := \sum_p G_p \cdot Z(f)^{(-p)}$ See FIG. 8, illustrating the symmetrical frequency response of the two output signals consistent with the previous discussion.

F := F2  $\quad\quad\quad\quad\quad\quad\quad\quad$ $LP(f) := \sum_p F_p \cdot Z(f)^{(-p)}$  $\quad\quad$ G := F $G_{\frac{LEN-1}{2}} := -0.5$  $\quad\quad\quad$ $HP(f) := \sum_p G_p \cdot Z(f)^{(-p)}$

What is claimed is:

1. A mobile cable locating instrument comprising:
   one or more antennas configured to detect magnetic fields radiating from a cable;
   one or more audiovisual components configured to provide, to a user of the mobile cable locating instrument, one or more audiovisual representations of a locate signal for locating the cable, the locate signal being associated with one or more of a power mode signal and a radio mode signal associated with the cable; and
   a combined filter connected to the one or more antennas and the one or more audiovisual components to receive an input value based on the detected magnetic fields from the one or more antennas and provide the power mode signal and the radio mode signal to the one or more audiovisual components, simultaneously, the combined filter comprising:
   a half-band finite-input response (FIR) filter coupled to the one or more antennas, having a structure of taps with an odd number of taps, numbered 0 through N, where N is an even number, and a median tap, the median tap being one of the odd number of taps, wherein filter coefficients for each odd numbered tap is zero, the half-band FIR response filter providing a filter value from the input value;
   a right shifter that is connected to the FIR filter, receives a median value from the median tap and shifts the median value right by one bit to provide a half median value;
   an adder that is connected to the FIR filter and the right shifter, adds the filter value and the half median value to provide a low-pass filter value, the low-pass filter value corresponding to the power mode signal; and
   a subtractor that is connected to the FIR filter and the right shifter, subtracts the half median value from the filter value to provide a high-pass filter value, the high-pass filter value corresponding to the radio mode signal.

2. The cable locating instrument of claim 1, wherein the half-band FIR response filter includes
   N delays coupled in series structure, wherein outputs of each of the N delays are taps numbered 1 through N and an input to the N delays is tap 0;
   an array of multipliers that are connected to the FIR filter, each receiving an output value from one of the even numbered taps, each multiplier multiplying the output value from each of the even numbered taps by a corresponding filter coefficient; and
   an adder array receiving and adding results from each of the multipliers to provide the filter value.

3. The cable locating instrument of claim 2, wherein low-pass filter value is given by $$LPFY(n)=\Sigma_{j=0}^{2i+1} b_{2j} X(n-2j) - \tfrac{1}{2} X(n-(2i+1)),$$

where $2(2i+1)=N$.

4. The cable locating instrument of claim 2, wherein the high-pass filter value is given by $$LPFY(n)=\Sigma_{j=0}^{2i+1} b_{2j} X(n-2j) - \tfrac{1}{2} X(n-(2i+1)),$$

where $2(2i+1)=N$.

5. A method of locating a cable radiating magnetic fields including a power mode signal and a radio mode signal, comprising:
   receiving, via an electrically coupling means, from one or more antennas configured to detect the magnetic fields radiating from the cable, an input value, into a half-band finite impulse response (FIR) filter having a structure of taps with an odd number of taps labeled 0 through N with corresponding filter coefficients labeled 0 through N where odd numbered filter coefficients are zero, the FIR filter being connected to the one or more antennas and one or more audiovisual components, the FIR filter providing a filter value;
   digitally shifting, via an electrically coupling means between a right shifter and the FIR filter, a median value from the FIR filter to provide a half median value;
   adding, via an electrically coupling means between an adder, the FIR filter, and the right shifter, the half median value to the filter value to provide a low-pass filter value corresponding to the power mode signal; and
   subtracting, via an electrically coupling means between a subtractor, the FIR filter and the right shifter, the half median value from the filter value to provide a high-pass filter value corresponding to the radio mode signal; and
   providing, simultaneously, one or more audiovisual representations of a locate signal for locating the cable to the one or more audiovisual components, the locate signal being associated with one or more of the power mode signal and the radio mode signal.

6. The method of claim 5, wherein low-pass filter value is given by $$LPFY(n) = \sum_{j=0}^{2i+1} b_{2j} X(n-2j) + \frac{1}{2} X(n-(2i+1)),$$

where $2(2i+1)=N$.

7. The method of claim 5, wherein the high-pass filter value is given by $$HPFY(n)=\Sigma_{j=0}^{2i+1} b_{2j} X(n-2j) - \tfrac{1}{2} X(n-(2i+1)),$$

where $2(2i+1)=N$.

* * * * *